Dec. 18, 1951  R. L. TRIMBLE ET AL  2,579,058
SHOCK ABSORBER PISTON ASSEMBLY
Filed Aug. 25, 1949  2 SHEETS—SHEET 1
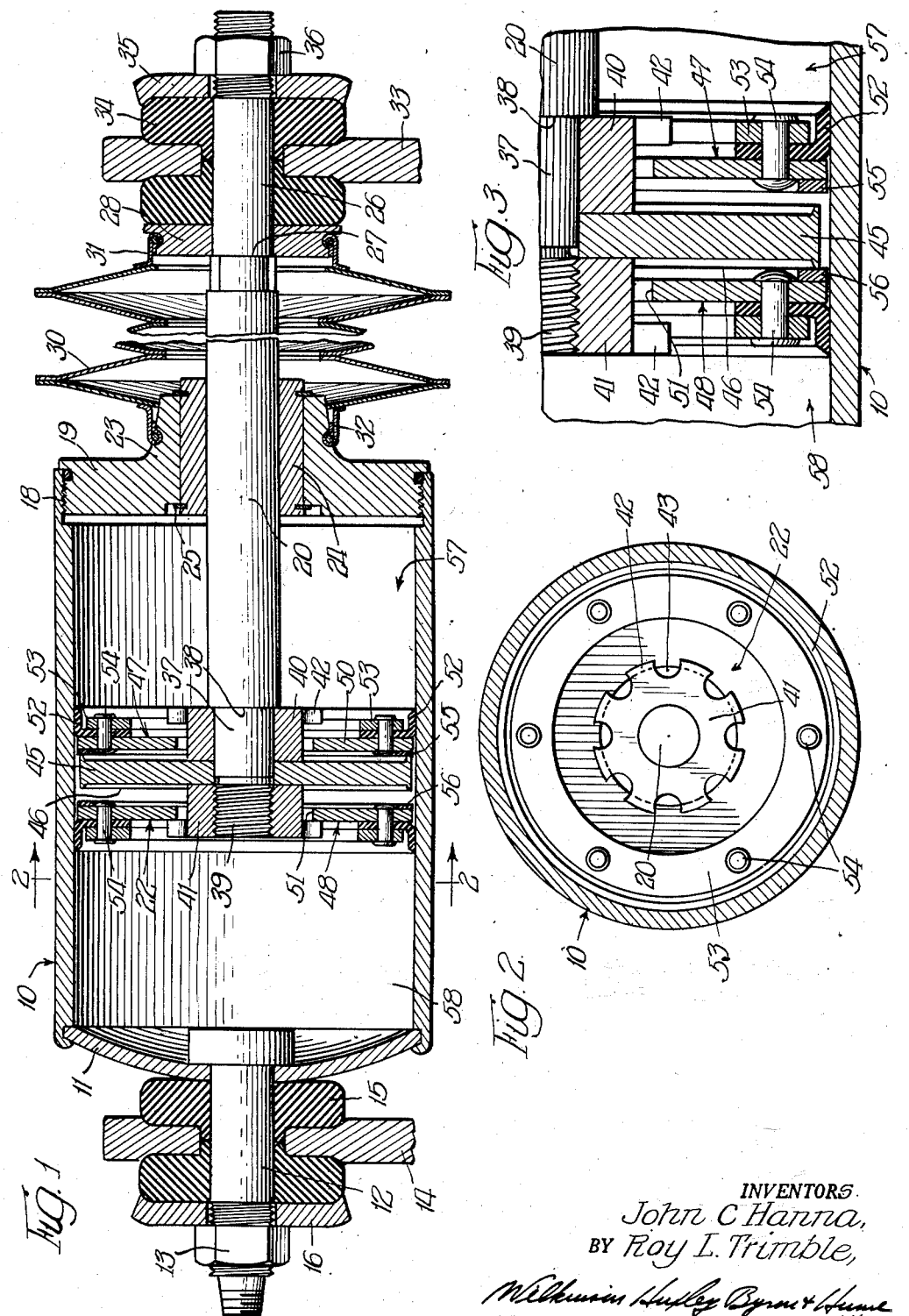
INVENTORS
John C Hanna,
BY Roy L. Trimble,

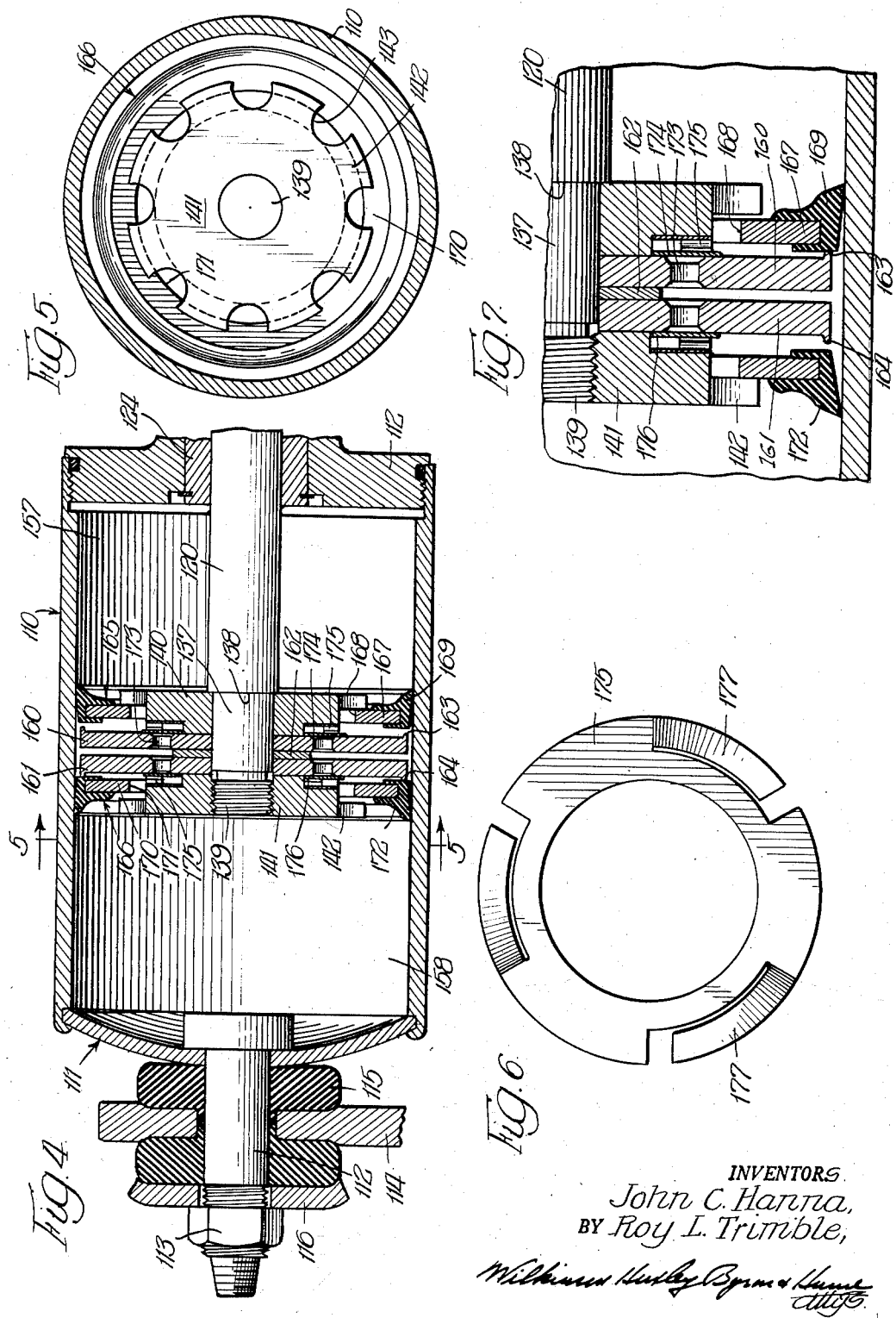

Patented Dec. 18, 1951

2,579,058

UNITED STATES PATENT OFFICE 2,579,058

SHOCK ABSORBER PISTON ASSEMBLY

Roy Lane Trimble and John Clark Hanna, Chicago, Ill., assignors to Hanna Engineering Works, Chicago, Ill., a corporation of Illinois Application August 25, 1949, Serial No. 112,251

1 Claim. (Cl. 188—88)

The invention relates to shock absorbing cylinders and has reference in particular to pneumatic shock absorbing and snubbing devices for use on track vehicles, road vehicles, airplanes and similar apparatus where it is desired to retard or cushion the movement between certain movable parts.

In shock absorbers of the class to which this invention applies the piston of the device is adapted to reciprocate very rapidly and it will be understood that the reciprocations will alternately compress and rarefy the fluid on the respective sides of the piston. At the end of a compression stroke and immediately after a reversal in piston movement, it is desirable to unload the high pressure in one end of the cylinder and deliver the same to the opposite end of the cylinder. Otherwise the weight of the appartus returning plus the energy stored in the compressed fluid would return the apparatus at shock velocity causing discomfort to passengers and possible damage to cargo being transported. In the Patent No. 2,525,317 granted to Willard J. Schupner October 10, 1950, for Shock Absorbing Cylinders, the reciprocating piston carries a valve member operated automatically by movement of the piston to permit flow of the compressed fluid through the piston in a controlled manner. The valve member functions at predetermined times in the stroke of the piston to permit flow of the fluid through the piston from one end of the cylinder to the other whereby to increase the snubbing effect.

An object of the present invention is to improve the automatic piston valve in shock absorbing devices of the type mentioned to further intensify the snubbing effect.

Another object of the invention is to improve the automatic piston valve in shock absorbing devices by incorporating the same in a compound piston arrangement, and wherein the improved valve means will operate to completely and effectively unload the high pressure fluid in one end of the cylinder and deliver the same immediately upon piston reversal to the opposite end for recompression.

Another and more specific object is to provide a shock absorbing cylinder which will incorporate a novel compound piston providing unique valve means having automatic operation upon reversing movement of the piston rod to connect the spaces on opposite sides of the piston, whereby to reduce the driving effect and increase the resisting effect for shock absorbing devices as herein explained.

Another object of the invention is to provide a compound piston for shock absorbers wherein valve means are formed by the arrangement of an intermediate driving section with a pair of driven sections. In the illustrated embodiment the driving section is fixed to and movable with the piston rod, whereas clearance exists between the driving section and the driven sections to permit limited movement between the parts at piston reversals for said valving action.

Another object of the invention is to provide a compound piston having valve means by reason of the constructional arrangement of the driving and driven sections of the piston and wherein the driven sections are provided with friction means which makes possible the desired valving action at the moment of piston reversal.

With these and various other objects in view, the invention may consist of certain novel features of construction and operation as will be more fully described and particularly pointed out in the specification, drawings and claim appended hereto.

In the drawings which illustrate an embodiment of the invention, and wherein like reference characters are used to designate like parts—

Figure 1 is a longitudinal sectional view taken substantially through the center of a shock absorbing and snubbing cylinder embodying the improved piston assembly of the invention;

Figure 2 is a transverse sectional view taken substantially along line 2—2 of Figure 1;

Figure 3 is an enlarged fragmentary sectional view of the piston assembly showing the driving section in its other position from that shown in Figure 1;

Figure 4 is a fragmentary sectional view taken longitudinally of a shock absorbing cylinder illustrating a modified form of piston assembly coming within the invention;

Figure 5 is a transverse sectional view taken substantially along line 5—5 of Figure 4;

Figure 6 is a plan view illustrating the type of spring used in the valve means of Figure 4; and Figure 7 is a fragmentary sectional view illustrating the driving section of the piston in its other position from that shown in Figure 4.

Referring to the drawings and particularly Figures 1 and 3, one embodiment selected for illustrating the invention is shown as comprising a cylinder 10 having suitably secured to the rear end thereof the end member 11. The end member is provided with a central rearwardly projecting stud 12 having a threaded extremity for receiving the securing nut 13. The stud functions as securing means for bracket 14 which is provided with an aperture somewhat larger than the stud so that substantial movement can occur between the same and the bracket. The bracket is preferably dished for receiving the rubber cushioning members 15 which are also supported by the stud and the whole assembly is retained in place, being securely united to the end member 11 by cap 16. It will be seen that a rubberized substantially uniform joint is provided between the bracket 14 and the cylinder 10, the bracket being secured to a part of the vehicle having movement relative to another part or with respect to which movement takes place.

The forward end of the cylinder 10 is internally threaded as at 18 for receiving the forward end member 19 which is accordingly releasably secured to the cylinder at this end. The member 19 is provided with an opening for passage of the piston rod 20 centrally through the end member and which piston rod has the piston arrangement indicated by numeral 22 suitably secured thereto and which is adapted to reciprocate within cylinder 10 from a position adjacent the rear end member 11 to the forward end member 19 and return. The central opening in member 19 is defined by the forwardly extending boss 23 which receives the packing gland 24 releasably secured in place by the retaining rings 25. The piston rod 10 has a close fit in packing gland 24 which assures an hermetic seal at this end of the cylinder, permitting, however, free and unobstructed reciprocating movement of the piston rod as is well understood in shock absorbers of this type.

The projecting end of the piston rod is slightly reduced in diameter as at 26 to form the shoulder 27 against which is positioned the disc 28. Said disc provides an anchorage for one end of the bellows 30, the same being suitably fixed to said disc around the periphery thereof as at 31. The other end of the bellows member 30 is suitably secured to the forward end member 19, the securing means for this end of the bellows being indicated by numeral 32. Reduced end 26 of the piston rod provides securing means for the bracket 33 which has an aperture of large diameter for receiving the reduced end and whereby substantial movement may take place between the bracket and piston rod 20. This movement, however, is cushioned by the rubber member 34 located on the respective sides of the bracket and securely held in place by the end cap 35 and securing screw 36.

The piston assembly is shown in section in Figure 1 and in the fragmentary view, Figure 3. The end of the piston rod within the cylinder is also reduced in diameter, forming a reduced end 37 providing shoulder 38 and which end is threaded as at 39. The piston assembly is held to this end of the piston rod by means of the nuts 40 and 41, each nut including a body portion having a flange 42, the periphery of which is interrupted by means of semicircular recesses 43. The nut is located on the reduced end 37 of the piston rod in contact with shoulder 38. Nut 41 is threaded to end 39 of the piston rod and as clearly shown in Figure 1 it will be seen that the nuts retain between them the disc 45 constituting the driving section of the present piston assembly. The disc 45 on each side is provided with a rim protuberance or lip 46 adapted to have valving action with driven sections, each constituting a built-up structure as will now be explained.

The nut 40 has a forward driven section associated therewith indicated in its entirety by numeral 47, whereas nut 41 has a rear driven section associated therewith indicated in its entirety by numeral 48. The sections are identical in construction and include a circular plate 50 having a central opening 51 of larger diameter than its respective nut but which opening is smaller in diameter than the flange 42 of said nut. However, as a result of the recesses 43 it is possible for a fluid to pass from one side of the plate 50 to the opposite side by flowing through the central opening 51. Each plate 50 is constructed to form a piston by reason of the ring packing 52 of leather or other suitable material and which is secured to its respective plate 50 by the securing ring 53 and rivet 54. The ring packing 52 is slightly larger in diameter than the plate 50 to which the same is secured, and whereas plate 50 does not contact the inside walls of cylinder 10 the ring packing, however, does engage the walls to form a seal therewith.

Each driven section is confined between the flange 42 of its respective retaining nut and the driving section or disc 45. It will be understood that each driven section is movable between said parts so that as disc 45 reciprocates the ring protuberance or lip 46 alternately contacts the inside surface of the driven sections to have valve action therewith. For this reason each driven section on its inside surface is provided with a molded rubber ring which is located adjacent the edge of plate 50 for contact by the disc 45. The rubber ring for section 47 is indicated by numeral 55 and the rubber ring for section 48 is indicated by numeral 56.

In operation of the structure above described it will be understood that disc 45 will reciprocate with movement of piston rod 20. As shown in Figure 1, it can be assumed that the disc 45 is moving in a forward direction toward the right. The lip 46 on disc 45 has accordingly contacted the rubber ring 55 on the driven section 47. The section is moved in a direction toward the right by the disc and at the same time the parts form a seal by reason of lip 46 contacting the rubber ring 55. Movement of these two parts of the piston assembly in a direction toward the right will compress the air in the forward chamber 57 and the pressure of the air within the rear chamber 58 will decrease. At the end of the compression stroke in this forward direction the piston rod will undergo a reversal in movement and immediately upon the same moving to the left the seal with respect to rubber ring 55 will be broken. The compressed fluid within chamber 57 will immediately flow through the piston into chamber 58 until the pressures in the two chambers are substantially equalized. It will be seen that air in chamber 57 will flow through opening 51 in plate 50 of the driven section 47 and then around disc 45 since the seal at 55 is broken, and the seal with respect to rubber ring 46 has not as yet become effective. The air enters chamber 58 by flow through center opening 51 of rear driving section 48. As movement of disc 45 in a direction to the left continues the lip 46 will contact rubber ring 56 and effect a seal. This terminates flow of air through the piston and also seals the driving section 45 with respect to driven section 48. Accordingly, movement of piston rod 20 in a rear direction will now compress the air in chamber 58. When the dead center position is reached and the piston rod undergoes a reversal in movement disc 45 moves away from rubber ring 56 to break the seal and the compressed air flows through the piston in a reverse direction to substantially equalize the pressures in the two chambers.

When the seal is broken between disc 45 and the rubber ring, either 55 or 56, it will be understood that flow of air through the piston takes place in an unobstructed manner and equalization of the pressures in the two chambers is instantaneous and complete. An adequate passage is provided for the flow since the same takes place through opening 51 which is ring-shaped, the same extending around a securing nut. The space between disc 45 and the inside walls of the cylinder is also entirely adequate since this space extends for the entire circumference of the disc. A unique feature of the valve action of the present piston assembly resides in the utilization of the friction between the ring packing 52 and the cylinder walls. At the end of a compression stroke there is a force tending to return each driven section at the same speed as disc 45 is being returned. However, this force is not sufficient to overcome the friction between the leather packing and the cylinder wall. It is true that the higher the cylinder pressure the greater the force tending to return the driven section, but this higher pressure also has the effect of holding the leather packing tighter against the cylinder walls. Accordingly, upon each piston reversal the disc 45 is able to move away from the driven section to break the seal therewith. The present piston assembly therefore has automatic valve action to control the flow of the compressed fluid through the piston and which takes place upon each reversing movement of the piston rod to reduce the driving effect and increase the resisting effect for shock absorbing purposes as herein explained.

In the modified form of Figure 4 the cylinder 110 is provided with the usual end members 111 and 112. The piston rod 120 passes through the packing gland 124 located in the forward end member 112 and the end of the piston rod within the cylinder is reduced as at 137, providing the shoulder 138. The said reduced end 137 receives the retaining nut 140 which is positioned in contact with shoulder 138. A similar retaining nut 141 is threaded to the end of reduced portion 137 by means of threads 139 and each nut is provided with a flange 142 having a plurality of semicircular recesses 143 formed therein. The two nuts are located on the respective sides of spaced discs 160 and 161 and the nuts fixedly secure the discs to the piston rod with the spacing member 162 maintaining them in desired spaced relation. Disc 160 is located to the forward end and the same is provided with the ring protuberance or lip 163. The disc 161 is located to the rear end and said disc is provided with ring protuberance or lip 164.

A driven section is retained by each nut, the section having limited movement relative to the nut between its respective disc and the flange 142 on the nut. The forward driven section indicated by numeral 165 consists of the plate 167 centrally apertured to provide opening 168. The plate is provided around its periphery with packing 169 which may be of molded synthetic rubber of the oil resisting type. Said packing is such as to contact the side walls of the cylinder 110 and form a seal therewith and also said packing has operation similar to that described with respect to Figure 1, wherein the pressure on the same will materially increase the friction of the packing on the cylinder walls, causing it to lag behind on the return stroke of the piston so as to break the seal and effect the desired valve action heretofore described. The rear driven section 166 is similarly constructed including a plate 170 centrally apertured at 171 and carrying rubber packing 172. The discs 160 and 161 are each provided with a plurality of valve openings 173, the openings on disc 160 being closed by the valve ring 164 and being maintained closed by the valve spring 175, Figure 6. The valve openings in disc 161 are closed by the valve ring 176, also maintained in closed relation by a valve spring such as 175, which is provided with a plurality of spring fingers 177 formed from the metal of the ring. As a result of the manner in which the valves are associated with the respective discs it will be seen that a high pressure existing between the discs can escape through one disc or the other to a lower pressure area by forcing open the valve ring of said disc.

In explaining the operation of the modified device of Figure 4 it will be assumed that piston reversal has taken place and disc 161 has just contacted the rubber packing ring 172, sealing the disc with respect to the rear driven member 166. As movement of the disc continues in a direction toward the left the driven section 166 will also be moved to compress the air within chamber 158. However, if piston reversal is rapid, as will often be the case due to a severe shock or jar on the device, the disc 161 may seal against the packing ring 172 before the pressures in the respective chambers have equalized by flow through the piston. Accordingly, with the parts as shown in Figure 4, the pressure between discs 160 and 161 is such as to force open valve ring 176 against the tension exerted by the spring fingers 177. The excess pressure from the forward side of the piston is discharged to the rear side notwithstanding that disc 161 is in sealing relation with the rear driven section. A similar operation can occur with the piston rod moving to the right or in a forward direction and with the lip 163 in sealing relation with the rubber packing 169, as shown in Figure 7. With the parts in this position and with pressure in chamber 158 greater than that in chamber 157 the excess pressure will force open the valve ring 174 and pass into the chamber until the pressures are equalized.

The invention is not to be limited to or by details of construction of the particular embodiment thereof illustrated by the drawings, as various other forms of the device will of course be apparent to those skilled in the art without departing from the spirit of the invention or the scope of the claim.

What is claimed is:

A shock absorber comprising a closed cylinder, a piston rod extending through one wall of the cylinder and adapted to have reciprocating movement, a piston assembly within the cylinder mounted on the piston rod and having a passage through the same for passing a fluid from one end of the cylinder to the other, said assembly comprising a disc member and a pair of independent piston sections, one being disposed on each side of the disc member, said disc member being fixed to the piston rod and the piston sections being mounted on the rod in a manner permitting relative movement of the sections with respect to the disc member in an axial direction and to a limited extent, a peripheral packing ring fixed to the outer surface of each piston section and having contact with the cylinder walls, said disc member having valve action with each section upon contacting the same to close the passage, whereby movement of the piston rod and thus the disc member at the beginning of a stroke in either direction will effect an opening valve action with respect to one piston section and a closing valve action with respect to the other piston section following an interval of time depending on the extent of relative movement between the parts and the speed of the piston rod, a ring of resilient material fixed to the inner surface of each piston section approximately opposite the peripheral packing ring for said section, and said disc member having a peripheral lip on each side of the same, whereby said lips contact the ring of resilient material on the piston sections respectively, as a result of the valve action which the disc member has with the piston sections.

ROY LANE TRIMBLE.
JOHN CLARK HANNA.

REFERENCES CITED

The following references are of record in the file of this patent:

UNITED STATES PATENTS

| Number | Name | Date |
| --- | --- | --- |
| 1,062,758 | Bayley | May 27, 1913 |
| 1,596,445 | Morinelli | Aug. 17, 1926 |
| 2,314,404 | Katcher | Mar. 23, 1943 |